(12) United States Patent
Nagar et al.

(10) Patent No.: US 11,170,540 B1
(45) Date of Patent: Nov. 9, 2021

(54) DIRECTIONAL BASED COMMANDS

(71) Applicant: INTERNATIONAL BUSINESS MACHINES CORPORATION, Armonk, NY (US)

(72) Inventors: Raghuveer Prasad Nagar, Kota (IN); Sarbajit K. Rakshit, Kolkata (IN); Manjit Singh Sodhi, Bangalore (IN); Satyam Jakkula, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/200,947

(22) Filed: Mar. 15, 2021

(51) Int. Cl.
*G06T 11/00* (2006.01)
*G06F 3/0346* (2013.01)
*G06F 3/01* (2006.01)

(52) U.S. Cl.
CPC .............. *G06T 11/00* (2013.01); *G06F 3/013* (2013.01); *G06F 3/0346* (2013.01)

(58) Field of Classification Search
CPC ......... G06T 11/00; G06T 15/00; G06T 19/00; G06T 19/003; G06T 19/006; G06F 3/011; G06F 3/013; G06F 3/0346
USPC ......................................................... 345/633
See application file for complete search history.

(56) References Cited

U.S. PATENT DOCUMENTS

| | | | |
|---|---|---|---|
| 10,268,266 B2 | 4/2019 | Mathey-Owens | |
| 10,360,452 B2 | 7/2019 | Kim | |
| 11,055,920 B1* | 7/2021 | Bramwell | H04N 7/147 |
| 2011/0037712 A1* | 2/2011 | Kim | H04M 1/72457 345/173 |
| 2017/0039774 A1* | 2/2017 | Estable | H04N 13/344 |
| 2017/0168566 A1 | 6/2017 | Osterhout | |

(Continued)

FOREIGN PATENT DOCUMENTS

| | | |
|---|---|---|
| CN | 102736599 B | 9/2014 |
| CN | 104932255 B | 11/2018 |

(Continued)

OTHER PUBLICATIONS

Kim et al., "Hybrid-BCI Smart Glasses for Controlling Electrical Devices", https://ieeexplore.ieee.org/abstract/document/7285345, 2015 SICE, pp. 1-5.

(Continued)

*Primary Examiner* — Sae Won Yoon
(74) *Attorney, Agent, or Firm* — Tihon Poltavets (57) ABSTRACT

A method for directional based commands includes responsive to initializing an augmented reality device associated with a user, establishing a field of view for the augmented reality device associated with the user. The method establishes boundaries for a directional command area, where the directional command area includes a plurality of devices configurable to receive commands from the augmented reality device associated with the user. The method receives a first command performable by at least two devices from the plurality of devices and receives orientation data from the augmented reality device associated with the user. The method determines a first device from the plurality of devices for performing the first command based at least on the orientation data and the field of view of view for the augmented reality device associated with the user and sends the first command to the first device.

15 Claims, 6 Drawing Sheets

(56) References Cited

U.S. PATENT DOCUMENTS

| | | | | |
|---|---|---|---|---|
| 2017/0361213 A1* | 12/2017 | Goslin | ................... | A63F 13/20 |
| 2018/0004283 A1* | 1/2018 | Mathey-Owens | ...... | G06F 3/017 |
| 2019/0384389 A1* | 12/2019 | Kim | ..................... | G06F 3/0346 |
| 2020/0265647 A1* | 8/2020 | Cho | ....................... | G01K 1/024 |
| 2020/0401209 A1* | 12/2020 | Boss | ...................... | G06F 3/011 |
| 2021/0027538 A1* | 1/2021 | Bleyer | .................. | H04W 4/70 |
| 2021/0149551 A1* | 5/2021 | Lee | ......................... | H04L 29/08 |
| 2021/0176383 A1* | 6/2021 | Kim | ....................... | G06F 3/013 |

FOREIGN PATENT DOCUMENTS

| | | |
|---|---|---|
| CN | 109088803 A | 12/2018 |
| CN | 208596260 U | 3/2019 |
| EP | 2919093 A1 | 9/2015 |

OTHER PUBLICATIONS

Mell et al., "The NIST Definition of Cloud Computing", National Institute of Standards and Technology, Special Publication 800-145, Sep. 2011, pp. 1-7.

Ray, "How An Indoor Positioning System Works", https://www.airfinder.com/blog/indoor-positioning-system, Aug. 16, 2018, pp. 1-15.

* cited by examiner

DIRECTIONAL BASED COMMANDS

BACKGROUND

This disclosure relates generally to directional based commands, and in particular to performing directional based commands utilizing orientation and viewing direction of a user.

An intelligent virtual assistant (IVA) represents a software agent capable of performing various tasks for a user based on commands or questions provided by the user. The IVA is often incorporated into an Internet of Things (IoT) device, where the user provides the commands or questions in audible or textual form. An IoT device represents an electronic device capable of connecting and exchanging data with other devices and systems via the internet. For textual form, the user selects an IoT device to interact by manual selecting an application associated with the IVA and inputting the command or question in textual form. For audible form, a user vocally projects the command or question, where an IVA operating on an IoT device in a vicinity to the user receives the command or question vocally projected by the user. As the capabilities of IVAs expands, so does the incorporation into different IoT device types for performing differing tasks.

SUMMARY

Embodiments in accordance with the present invention disclose a method, computer program product and computer system for directional based commands, the method, computer program product and computer system can, responsive to initializing an augmented reality device associated with a user, establish a field of view for the augmented reality device associated with the user. The method, computer program product and computer system can establish boundaries for a directional command area, wherein the directional command area includes a plurality of devices configurable to receive commands from the augmented reality device associated with the user. The method, computer program product and computer system can receive a first command performable by at least two devices from the plurality of devices. The method, computer program product and computer system can, responsive to receiving orientation data from the augmented reality device associated with the user, determine a first device from the plurality of devices for performing the first command based at least on the orientation data and the field of view of view for the augmented reality device associated with the user. The method, computer program product and computer system can send the first command to the first device.

DETAILED DESCRIPTION

Embodiments of the present invention provide directional based commands in a defined directional command area that includes multiple devices capable of performing the commands. A directional command program initializes an augmented reality device associated with a user and establishes a field of view for the augmented reality device based on data received from multiple embedded sensors. The directional command program establishes boundaries for the directional command area, where the directional command area includes multiple devices capable of executing vocal commands from the user associated with the augmented reality device. The directional command program receives a command performable by at least one of the multiple devices within the directional command area, where the command is inputted by the user vocally, textual, and/or through a gesture as captured by a paired client device and/or augmented reality device. Responsive to receiving orientation data from the multiple embedded sensors for the user associated with the augmented reality device, the directional command program determines a target device from the multiple devices within the directional command area for performing the received command. The directional command program sends the command to the target device, where the target device receives and performs the command. The directional command program can receive a subsequent confirmation from the target device regarding the completion of the command and display the confirmation in the client device and/or the augmented reality device associated with the user.

Figure 1:
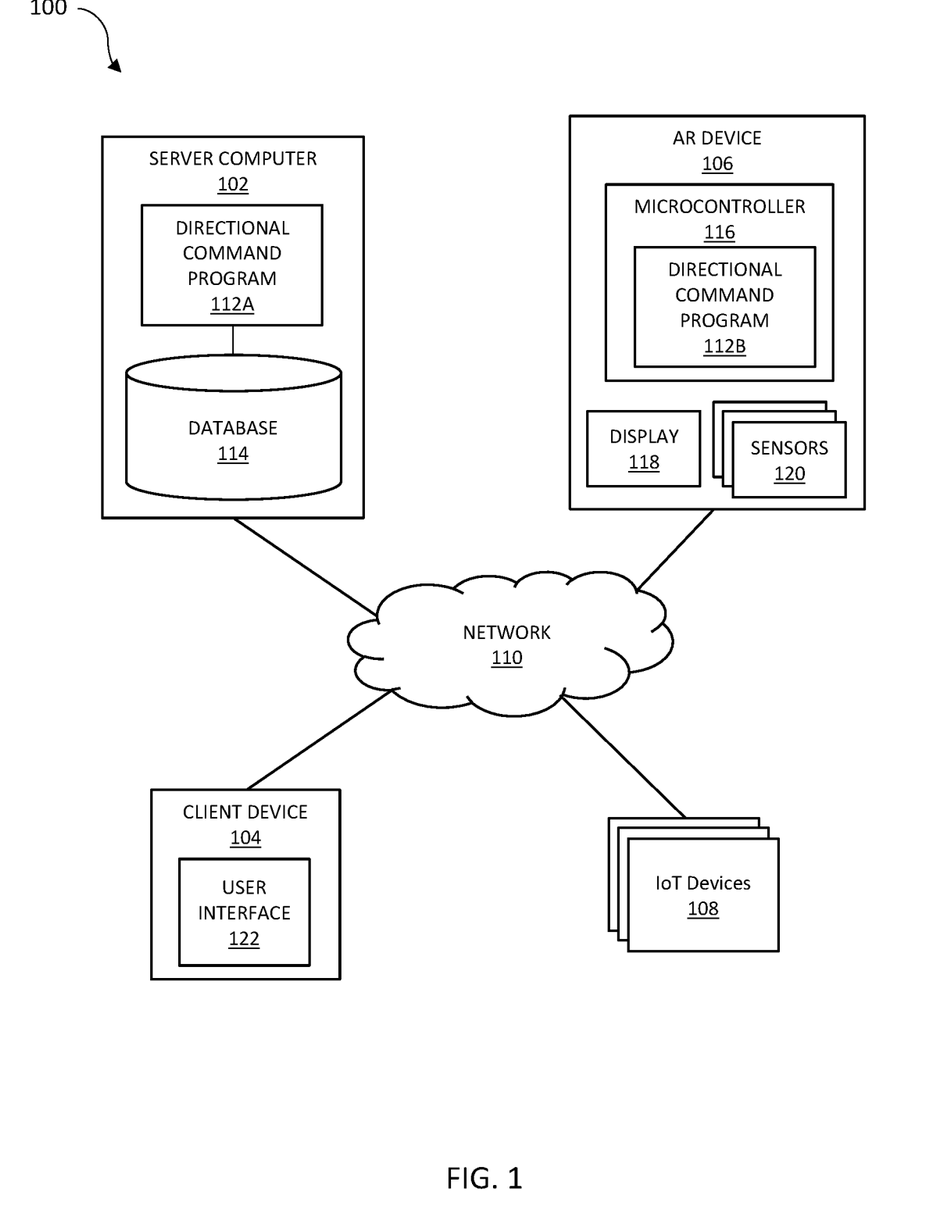
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, client device 104, augmented reality (AR) device 106, and Internet of Things (IoT) device 108 all interconnected over network 110. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with client device 104, AR device 106, IoT device 108, and other computing devices (not shown) within the distributed data processing environment via network 110. In another embodiment, server computer 102 represents a computing system utilizing clustered computers and components (e.g., database server computers, application server computers, etc.) that act as a single pool of seamless resources when accessed within the distributed data processing environment. Server computer 102 includes server-side directional command program 112A and database 114. Server computer 102 may include internal and external hardware components, as depicted and described in further detail with respect to FIG. 4.

Client device 104 can be a laptop computer, a tablet computer, a smart phone, smart watch, a smart speaker, or any programmable electronic device capable of communicating with various components and devices within the distributed data processing environment (e.g., server computer 102, AR device 106, and IoT devices 108), via network 110. Client device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 110. In one embodiment, client device 104 represents one or more devices associated with a user. Client device 104 includes an instance of user interface 122 for interacting with directional command program 112A on server computer 102 and directional command program 112B on AR device 106.

AR device 106 represent user wearable augment reality device (e.g., electronic contact lens, wearable electronic headset) with integrated microcircuitry capable of displaying content to the user. AR device 106 includes microcontroller 116, display 118, sensors 120, where directional command program 112B operating on microcontroller 116 provides directional command program 112A with various user data from sensors 120 and displays content on display 118 to the user of AR device 106. Microcontroller 116 can include a display control circuit for display 118, a communication and power conversion circuit for communicating via network 110 and managing an integrated power supply, and a sensor readout and control circuit for monitoring eye movement of the user wearing AR device 106. Display 118 allows for a user of AR device 106 to view various notifications from directional command program 112A and 112B. In an example where AR device 106 is an electronic contact lens, display 118 is a semitransparent display and microlens array is integrated into AR device 106 for viewing content. AR device 106 can also include a power storage module, a solar cell module for charging the power storage module, a biosensor module for collecting data (e.g., tracking eye movement), and a communications and power module for communicating with server computer 102, client device 104, and IoT devices 108 via network 110. Sensors 120 (e.g., biosensor module) collect various data for the user of AR device 106, where directional command program 112 utilizes the data collected by sensors 120 to send commands to IoT devices 108 via network 110. Sensors 120 can include one or more of: an accelerometer, a gyroscope sensor, and an orientation sensor (e.g., position sensor, location sensor). AR device 106 also includes one or more cameras for capturing eye movements of the user wearing AR device 106 and for capturing images of a field of view of the user.

IoT devices 108 represent an electronic device connected to network 110 capable of receiving and executing a voice command provided by a user of client device 104 and/or AR device 106. IoT devices 108 can include an instance of an intelligent virtual assistant (IVA) representing a software agent capable of performing various tasks for a user based on commands or questions provided by the user. IoT devices 108 can include but not limited to appliances, home security systems, health monitoring devices, factory equipment, wireless inventory trackers, biometric security scanners, and any other electronic device embedded with sensors and software for connecting and exchanging data with other devices and systems over the Internet (e.g., network 110).

Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server computer 102, client device 104, AR device 106, IoT devices 108, and other computing devices (not shown) within the distributed data processing environment.

Directional command program 112 initializes AR device 106 associated with a user and establishes a field of view for AR device 106 based on data received from sensors 120. Directional command program 112 establishes boundaries for a directional command area, where the directional command area include multiple IoT device 108 capable of executing vocal commands from the user associated with AR device 106. Directional command program 112 receives a command performable by at least one of the multiple IoT device 108, where the command is inputted by the user vocally and/or textual on a paired client device 104 and/or AR device 106. Responsive to receiving orientation data from sensors 120 for the user associated with AR device 106, directional command program 112 determines a target IoT device 108 from the multiple IoT devices 108 within the directional command area for performing the received command. Directional command program 112 sends the command to the target IoT device 108, where the target IoT device 108 receives and performs the command. Subsequently, directional command program 112 can receive a confirmation from the target IoT device 108 in client device 104 and/or AR device 106 regarding the command being successfully performed by the target IoT device 108.

Database 114 is a repository that stores various data including floorplans (e.g., private residence, manufacturing floor, warehouse floor), historical operational data for a user of AR device 106, historical user data from sensors 120 on AR device 106, historical operational data for each IoT device 108, and any other data pertinent to directional command program 112 for determining a target IoT device 108 within a directional command area for sending a command performable by multiple IoT devices 108. In the depicted embodiment, database 114 resides on server computer 102. In another embodiment, database 114 may reside on client device 104 or elsewhere within the distributed data processing environment provided directional command program 112 has access to database 114. A database is an organized collection of data, where database 114 can be implemented with any type of storage device capable of storing data and configuration files that can be accessed and utilized by directional command program 112, such as a database server, a hard disk drive, or a flash memory.

User interface 122 enables a user to make requests of or issue commands to server computer 102, client device 104, AR device 106, and IoT device 108 via network 110. User interface 122 also enables the user to receive information and instructions in response on client device 104 via network 110. In one embodiment, a user of client device 104 accesses user interface 122 via voice commands in natural language. In one embodiment, user interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 122 enables a user of client device 104 to interact with each instance of directional command program 112A and 112B operating on server computer 102 and AR device 106, respectively.

Figure 2:
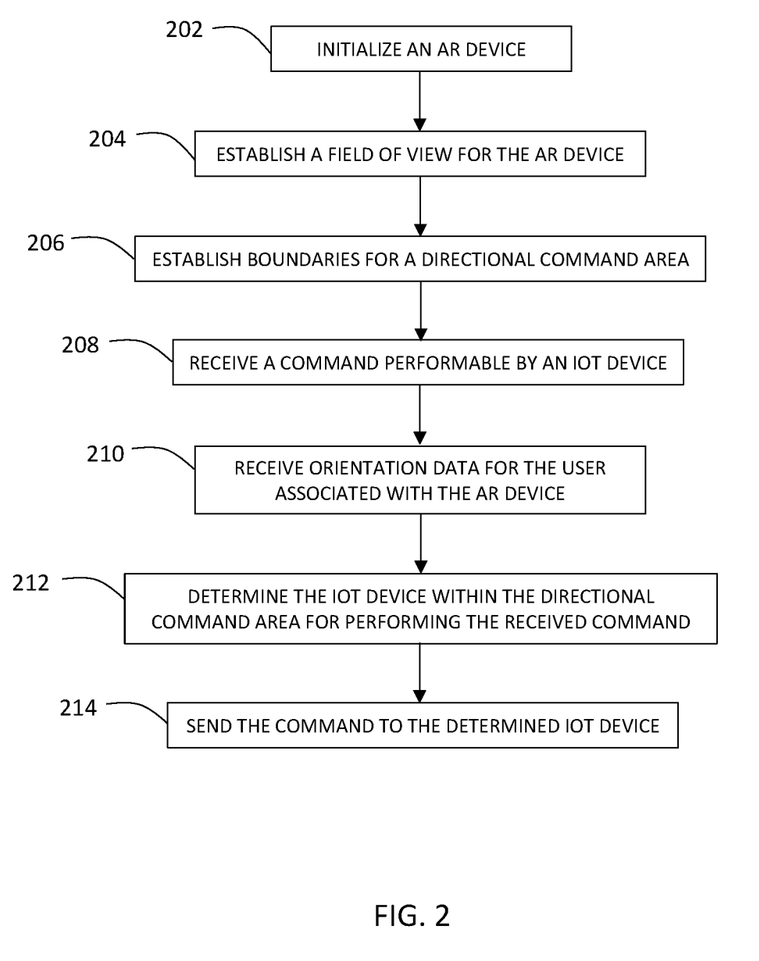
FIG. 2 depicts a flowchart for a directional command program for sending a command to an IoT device within a directional command area, in accordance with an embodiment of the present invention.

FIG. 2 depicts a flowchart for a directional command program for sending a command to an IoT device within a directional command area, in accordance with an embodiment of the present invention.

Directional command program 112 initializes (202) an AR device. Directional command program 112 utilizes one or more sensors on the AR device to detect when the AR device is being worn by a user. In one embodiment, AR device is a headset being worn by the user, where directional command program 112 initializes the headset by instructing an integrated camera to verify a user wearing the headset (e.g., vocal password, retinal scan). In this embodiment, AR device is an electronic contact lens being worn by the user, where directional command program 112 initializes the electronic contact lens by pairing a client device (e.g., smart phone) associated with the user to the electronic contact lens. The electronic contact lens can include a communications and power module on the electronic contact lens for communicating, via a network connection, with the client device associated with the user. Subsequently, directional command program 112 determines whether a profile exists for the paired electronic contact lens, where the profile includes a determined field of view for the electronic contact lens, established boundaries for a directional command area, and established rules for sending commands to multiple IoT device in the directional command area. For an instance where directional command program 112 determines a profile exists for the electronic contact device, directional command program 112 initializes the electronic contact lens by configuring the electronic contact lens according to the profile and awaiting receipt of a command performable by an IoT device in the directional command area. However, in this embodiment, directional command program 112 determines a profile does not exist for the electronic contact device and directional command program 112 creates a profile for the electronic contact lens by establishing a field of view for the electronic contact lens and boundaries for a directional command area.

Directional command program 112 establishes (204) a field of view for the AR device. The field of view area of the AR device represents an area designated as a line of sight for a user associated with the AR device. In this embodiment, directional command program 112 establishes the field of view for the AR device by determining a shape of an eye of the user wearing the AR device. Based on the determined shape of the eye of the user wearing the electronic contact lens, directional command program 112 determines the field of view area for the AR device that includes a central vision area and a peripheral area surrounding the central vision area. Directional command program 112 stores the established field of the view for the AR device with a user profile associated with the user of AR device 106. Directional command program 112 allows for the user to adjust boundaries for a field of view for the AR device, to ensure directional command program 112 can accurately determine a target IoT device within a directional command area for performing a command received from the user of the AR device. Directional command program 112 allows for the user to adjust the field of view via eye movements as detected by the AR device and/or via user inputs on the client device paired with the AR device.

For adjusting the boundaries of the field of view via eye movements as detected by AR device, directional command program 112 can request the user trace an outer perimeter through eye movements captured by one or more components (e.g., camera) on the AR device. Directional command program 112 creates an outline of the field of view for the AR device based on the outer perimeter traced by the eye movements of the user and captured by the one or more components of the AR device. For adjusting the boundaries of the field of view via user inputs on the paired client device, directional command program 112 can request the user trace an outer perimeter in a user interface on the paired client device. Direction command program 112 can display the field of view area of the AR device in the user interface of the client device and the user can trace (e.g., user input on a touch screen) the outer perimeter of the field of view in the user interface of the paired client device. As the user traces outer perimeter, directional command program 112 displays the tracing of the outer perimeter of the field of view in real time as the user provides the user input into the user interface on the client device. directional command program 112 creates an outline of the field of view based on the traced outer perimeter and thus, determines the field of view for the AR device based outer perimeter inputted on the paired client device.

Directional command program 112 establishes (206) boundaries for a directional command area. In this embodiment directional command program 112 establishes boundaries for a directional command area and stores the boundaries for the directional command area with a user profile associated with the user of the AR device 106. Directional command program 112 can establish multiple directional command areas based on a location of the AR device associated with user and categorize each of the multiple directional command areas accordingly. Categorizes for the multiple directional command areas can include professional (e.g., office building, manufacturing floor, warehouse floor), personal (e.g., residence, vehicle), and public (e.g., airport, stadium) In one example, directional command program 112 determines the user of the AR device has a entered a manufacturing facility based on the AR device pairing to a local network, where the manufacturing facility includes multiple sections. Each section of the manufacturing facility represents a single directional command area, where each section of the manufacturing facility includes multiple IoT devices that can receive vocal commands from the user. Directional command program 112 utilizes known floorplans for each section of the manufacturing facility to establish boundaries for a directional command area. Therefore, directional command program 112 avoids sending a command to an IoT device located in a section of the manufacturing facility that is different than another section of the manufacturing facility in which the user of the AR device is located. In some embodiments, directional command program 112 determines that the AR device associated with the user can only send commands to a portion of the multiple IoT devices in each section of the manufacturing facility based on operating qualifications of the user. The operating qualifications of the user for each of the multiple IoT devices in each section is stored with a user profile for the user and directional command program 112 can verify whether the user has the appropriate operating qualifications for each of the multiple IoT device prior to sending the command to the target IoT device.

In another example, directional command program 112 determines the user of the AR device is located in a private residence based on location information received from the AR device. Alternatively, directional command program 112 determines the user of the AR device is located in the private residence based on the AR device pairing to a local network at the private residence. Directional command program 112 determines the private residence includes multiple IoT devices located across multiple rooms (e.g., kitchen, bedroom) on multiple floors (e.g., basement, ground floor) by querying the IoT device connected to the local network and determining a location for each of the IoT devices. Directional command program 112 has the ability to send a command to a target IoT device out of the multiple IoT devices locations the multiple rooms on the multiple floors of the private residence.

Directional command program 112 receives (208) a command performable by an IoT device. Directional command program 112 receives a vocal command from the user associated with the AR device, where the vocal command is performable by an IoT device out of the multiple IoT devices within the directional command area. In one embodiment, responsive to directional command program 112 analyzing the received vocal command, directional command program 112 determines only a single target IoT device out of the multiple IoT devices within the directional command area is capable of performing the vocal command and sends the vocal command to the single target IoT device to be performed. In this embodiment, directional command program 112 receives a vocal command from the user associated with the AR device and responsive to analyzing the received vocal command, determines at least two IoT devices from the multiple IoT devices can perform the vocal command.

In one example, directional command program 112 previously established a directional command area as a manufacturing facility, where each of the multiple IoT device represents a manufacturing device for performing a given task (e.g., polishing, sanding, supporting) within a section of the manufacturing facility in which a user with an associated AR device is located. Directional command program 112 receives a vocal command from the user via the AR device, where the vocal command states, "Pivot the component 45 degrees about the x-axis". Directional command program 112 analyzes the received vocal command and determines at least two of the IoT devices out of the multiple IoT devices located within the section of the manufacturing facility where the user with the associated AR device is located, can perform the vocal command. Directional command program 112 can narrow a list of the multiple IoT devices to the at least two IoT devices capable of performing the vocal command when determining a target IoT device to send the vocal command. In another example, directional command program 112 previously established a directional command area as a private residence, where multiple IoT device are located in multiple rooms across multiple floors of the private residence. Directional command program 112 receives a vocal command from the user of the AR device, where the vocal command states, "Please turn on". Directional command program 112 analyzes the received vocal command and determines at least two of the IoT devices out of the multiple IoT devices located within the private residence where the user with the associated AR device is located, can perform the vocal command. Directional command program 112 can narrow a list of the multiple IoT devices to the at least two IoT devices capable of performing the vocal command when determining a target IoT device to send the vocal command.

Directional command program 112 receives (210) orientation data for the user associated with the AR device. Directional command program 112 receives orientation data for the user associated with the AR device that includes sensory data for the user and one or more images as captured by one or more cameras on the AR device. The sensory data is collected by one or more sensors on the AR device associated with the user and include an accelerometer, a gyroscope sensor, and an orientation sensor. Directional command program 112 utilizes the sensory data from an accelerometer to determine if the user is stationary, walking, or running. Directional command program 112 utilizes sensory data from a gyroscope sensor to determine if the user is upright, leaning forward, leaning backwards, and/or bending down. Directional command program 112 utilizes an orientation sensor to determine a direction the user is facing while stationary or moving. The one or more images captures by the one or more cameras on the AR device can include an image of the field of view for the AR device and an image of an eye of the user associated with the AR device.

Directional command program 112 determines (212) the IoT device within the directional command area for performing the received command. Directional command program 112 determines a target IoT device within the directional command area for performing the received command based on an analysis of the received command and the received orientation data for the user associated with the AR device that includes the sensory data and the one or more captured images. As previously discussed, directional command program 112 can analyze the received vocal command and identify a portion of the multiple IoT devices within the directional command area that can perform the received vocal command. Directional command program 112 can determine the target IoT device from the portion of the multiple IoT devices based on the received orientation data for the user associated with the AR device that includes the sensory data and the one or more captured images. Directional command program 112 can further utilize historical data for previously determined target IoT devices within the directional command area for performing received command for comparison to prevent any false positives (i.e., incorrectly determining a target IoT device), In one example, directional command program 112 previously established a directional command area as a manufacturing facility, where each of the multiple IoT device represents a manufacturing device for performing a given task (e.g., polishing, sanding, supporting) within a section of the manufacturing facility in which a user with an associated AR device is located. Directional command program 112 also received a vocal command from the user via the AR device, where the vocal command states, "Pivot the component 45 degrees about the x-axis". Utilizing the sensory data received from the AR device, directional command program 112 determines that the user is upright, stationary, and facing a southwest corner of the section of the manufacturing facility. Based on the established field of view for the AR device and a determined orientation of the user (i.e., facing the southwest corner), directional command program 112 determines that Machinery AB is the target IoT device to which the user is directing the vocal command. Directional command program 112 can also utilize an image of a field of view received in the orientation data for the user associated with the AR device to determine the target IoT device by performing object recognition to identify the target IoT device in the image.

In another example, directional command program 112 previously established a directional command area as a private residence, where multiple IoT device are located in multiple rooms across multiple floors of the private residence. Directional command program 112 also received a vocal command from the user of the AR device, where the vocal command states, "Please turn on". Utilizing the sensory data received from the AR device, directional command program 112 determines that the user is upright, walking, and entering a kitchen area of the private residence with their head tilted back (i.e., AR device is tilted back). Based on the established field of view from the AR device and a determined orientation of the user, directional command program 112 determines that an overhead light in the kitchen area of the private residence is the target IoT device out of the multiple IoT device. In yet another, directional command program 112 previously received a vocal command from the user of the AR device, where the vocal command states, "Please turn off". Directional command program 112 utilizes the sensory data received from AR device to determine the user is upright, stationary, with their head tilted back (i.e., AR device is tilted back). Based on the established field of view from the AR device, directional command program 112 determines no IoT devices are in the field of view of the AR device associated with the user. However, based on a known floorplan of the directional command area (i.e., the private residence), directional command program 112 determines the user with the AR device is a facing a television in a bedroom located on an upper floor within the directional command area, where the user with the AR device is located on a lower floor within the directional command area. Directional command program 112 determines that the television is the target IoT device within the directional command area for performing the received vocal command, despite the target IoT device not being in the field of view of the AR device.

In yet another example, directional command program 112 previously established a directional command area as a private residence, where multiple IoT device are located in multiple rooms across multiple floors of the private residence. Directional command program 112 also received a vocal command from the user of the AR device, where the vocal command states, "Please turn off". Utilizing the sensory data received from the AR device, directional command program 112 determines that the user is upright, stationary, and located in a dining room area of the private residence. Based on the established field of view from the AR device and a determined orientation of the user, directional command program 112 determines no IoT devices are located within the field of view of the AR device. However, based on an image received from the AR device in the orientation data for the user associated with the AR device, directional command program 112 utilizes object recognition to identify a target IoT device (e.g., climate control unit), where the image of the target IoT device is mirrored. Directional command program 112 confirms the target IoT device by determining a first location of the target IoT device relative to a second location of the user with the AR device and determining whether a reflected image of the target IoT device is capturable by the AR device between the first location and the second location.

Directional command program 112 sends (214) the command to the determined IoT device. Directional command program 112 sends the command to the determine IoT device via a network connection, where the IoT device performs the command and sends a confirmation to directional command program 112. Directional command program 112 can receive the confirmation of the performed command and display the confirmation of the perform command in the AR device and/or the client device paired to the AR device, associated with the user.

Figure 3:
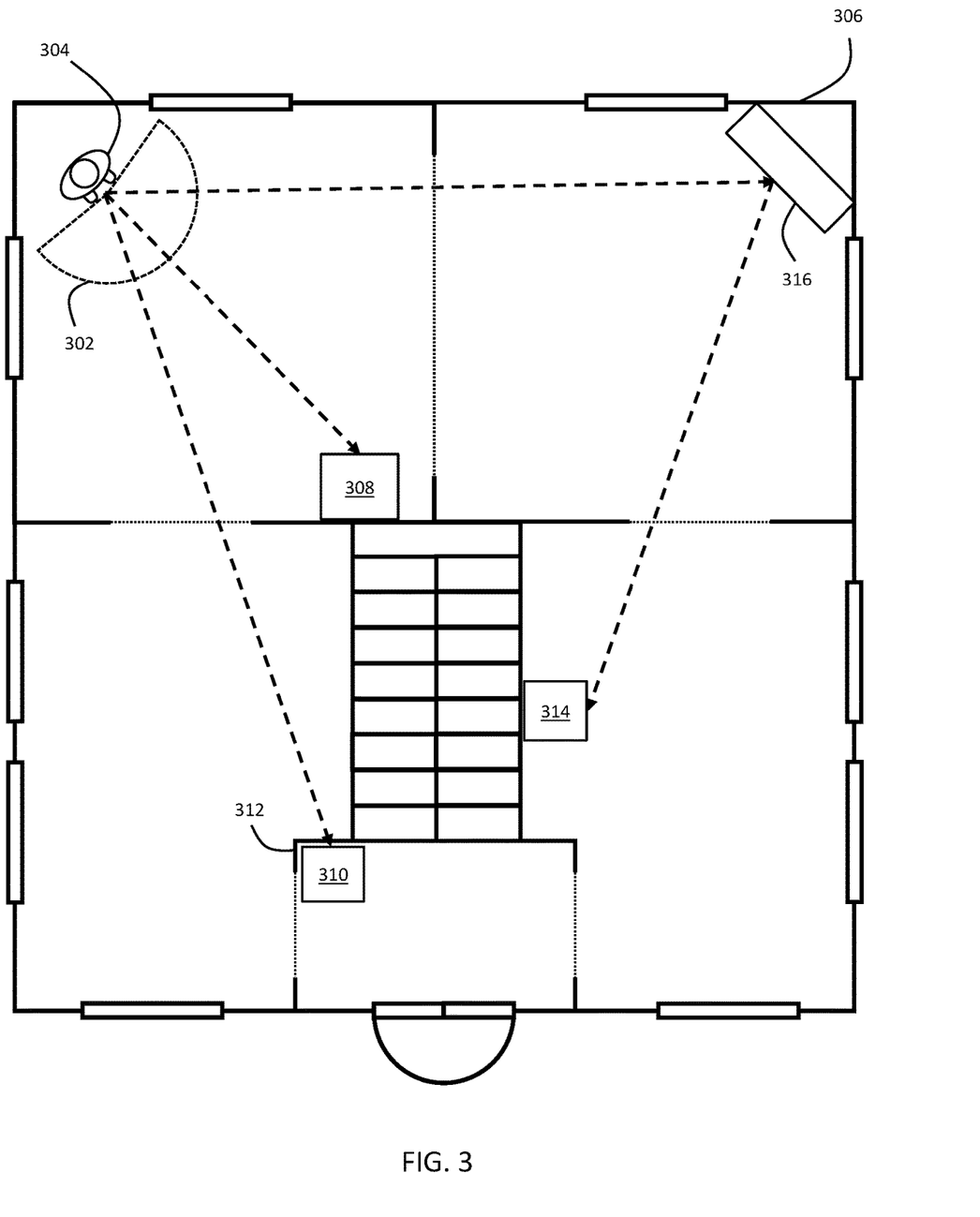
FIG. 3 illustrates an overhead view of a directional command program managing commands within a directional command area, in accordance with an embodiment of the present invention.

FIG. 3 illustrates an overhead view of a directional command program managing commands within a directional command area, in accordance with an embodiment of the present invention. In this embodiment, directional command program 112 establishes field of view 302 for user 304 and establishes boundaries for directional command area 306, where directional command area 306 represents a single floor of a residence. Directional command program 112 receives a command from an AR device associate with user 304, where the command is performable by IoT devices 308, 310, and 312. In one example, directional command program 112 receives orientation data for user 304 that includes sensory data for user 304 of the AR device and an image captured by the AR device, where the image is of an eye position for a line of sight of user 304. Based on the sensory data and the image captured by the AR device associated with user 304, directional command program 112 determines user 304 is upright, stationary, and facing a Southeast corner, where the image of the eye position for the line of sight of user 304 indicates user 304 is directing the command to IoT device 308.

In another example, directional command program 112 receives orientation data for user 304 that includes sensory data for user 304 of the AR device and two images captured by the AR device, a first image is a first-person perspective for field of view 302 and a second image includes an eye position for a line of sight of user 304. Based on the sensory data and the two images captured by the AR device associated with user 304, directional command program 112 determines user 304 is upright, stationary, facing a Southeast corner of directional command area 306, with the AR device in a tilt down position. Furthermore, directional command program 112 determines the first image of the first-person perspective for field of view 302 only includes IoT device 306 but the second image includes an eye position for the line of sight of user 304 that is not directed to IoT device 308. However, based on a known floorplan of directional command area 306, directional command program 112 determines that user 304 is also facing IoT device 310 obscured by wall 312 (i.e., object) and positioned in an entranceway to directional command area 306. Directional command program 112 determines that IoT device 310 is a target IoT device within directional command area 306 for performing a received vocal command, despite the target IoT device not being in the first image that includes the first-person perspective for field of view 302.

In yet another example, directional command program 112 receives orientation data for user 304 that includes sensory data for user 304 of the AR device and two images captured by the AR device, a first image is a first-person perspective for field of view 302 and a second image includes an eye position for a line of sight of user 304. Based on the sensory data and the two images captured by the AR device associated with user 304, directional command program 112 determines user 304 is upright, stationary, and facing an East corner of directional command area 306. Furthermore, directional command program 112, utilizing object recognition, identifies a mirrored IoT device 314 on object 316 in both the first image of the first-person perspective for field of view 302 and the second image for the eye position for the line of sight of user 304. Directional command program 112 confirms IoT device 314 as a target IoT device by determining a first location of IoT device 314 relative to a second location of user 304 and determining whether a reflected image of IoT device 314 is capturable by the AR device associated with user 304 between the first location and the second location, given a known floorplan for directional command area 306. Responsive to directional command program 112 determining the reflected image of IoT device 314 is capturable by the AR device associated with user 304 between the first location and the second location, sending the vocal command to IoT device 314 (i.e., the target device).

Embodiments of the present invention include a system where a user can utilize augmented realty-based devices to perform actions with target device or objects via eye positioning and/or movements, within a boundary area. Embodiments of the present invention can include an opt-in service, where a user has the ability to utilizes the invention described herein. A directional command program can define a floorplan for a directional command area, along with multiple IoT enabled device positioned throughout the directional command area. The multiple IoT device can also be recognized utilizing objection detection through image analysis of images captures by an augmented reality device associated with the user. An orientation sensor on the augmented reality device provides a direction the user is pointed, and a gaze point tracker can identify a user's eye direction in the surrounding directional command area. The user provides a voice or gesture command and based on an identified target device or object as captured by eye positioning and/or movements, sending the command to the identified target or object. Utilizing an augmented reality device, the user can visualize objects or device which are present with a vicinity or outside of the vicinity, along with a facial direction of the user and direct an eye positioning and/or movement towards a target device or object where a command is performable. The user has the ability to perform eye contact with target devices or objects as shown in a reflection of another object (e.g., mirror), where the system can identify the target device or object in the reflection and a physical location for the target device for performing the command is identified. Utilizing eye positioning and/or movement, along with hand and/or voice signals, a user can change a target field of view range of the user by setting boundaries for the field of view and selecting a select portion of target devices for performing a command.

Figure 4:
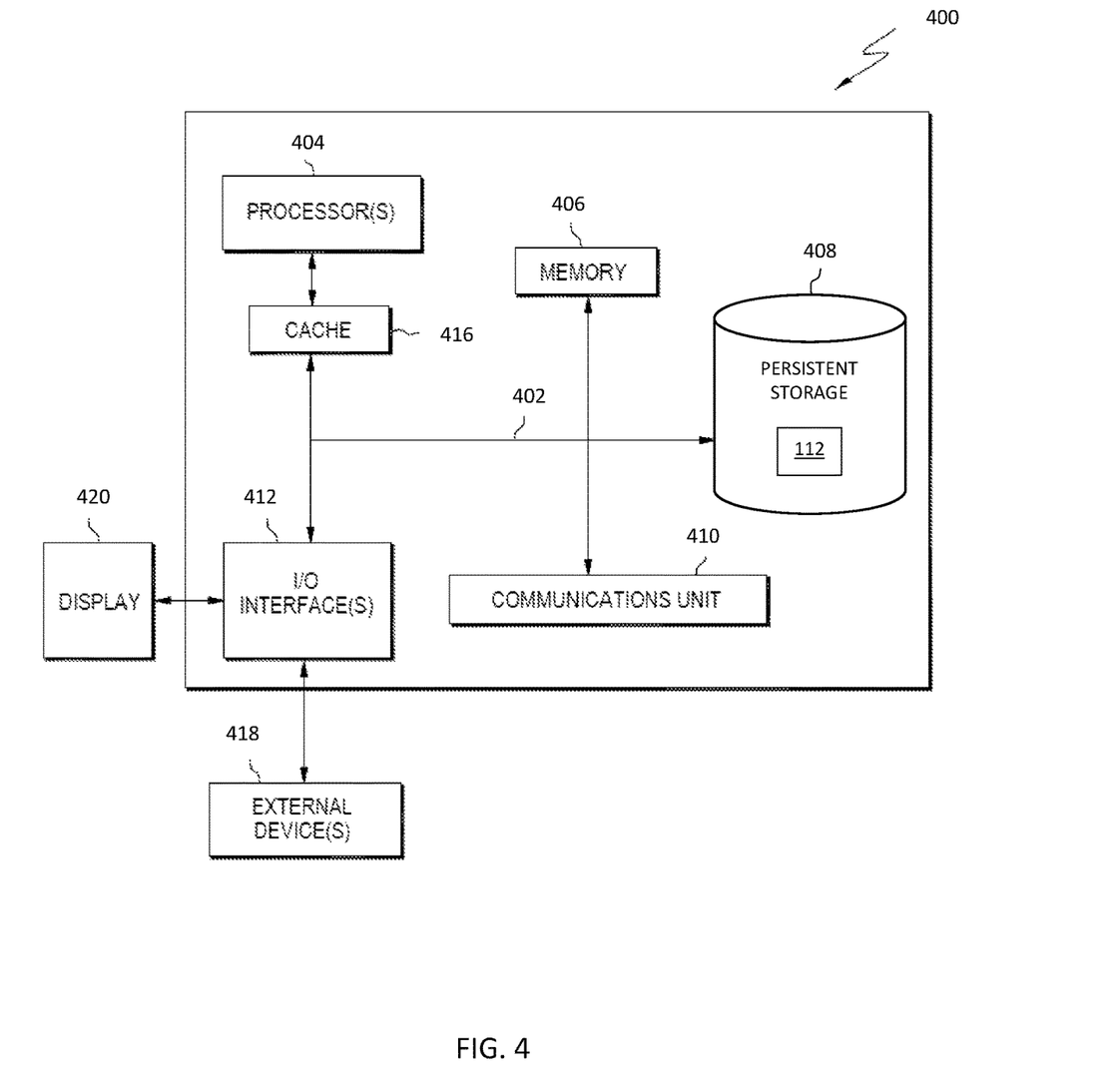
FIG. 4 is a block diagram of components of a computer system, such as the server computer of FIG. 1, in accordance with an embodiment of the present invention.

FIG. 4 depicts computer system 400, where server computer 102 is an example of a computer system 400 that includes directional command program 112. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
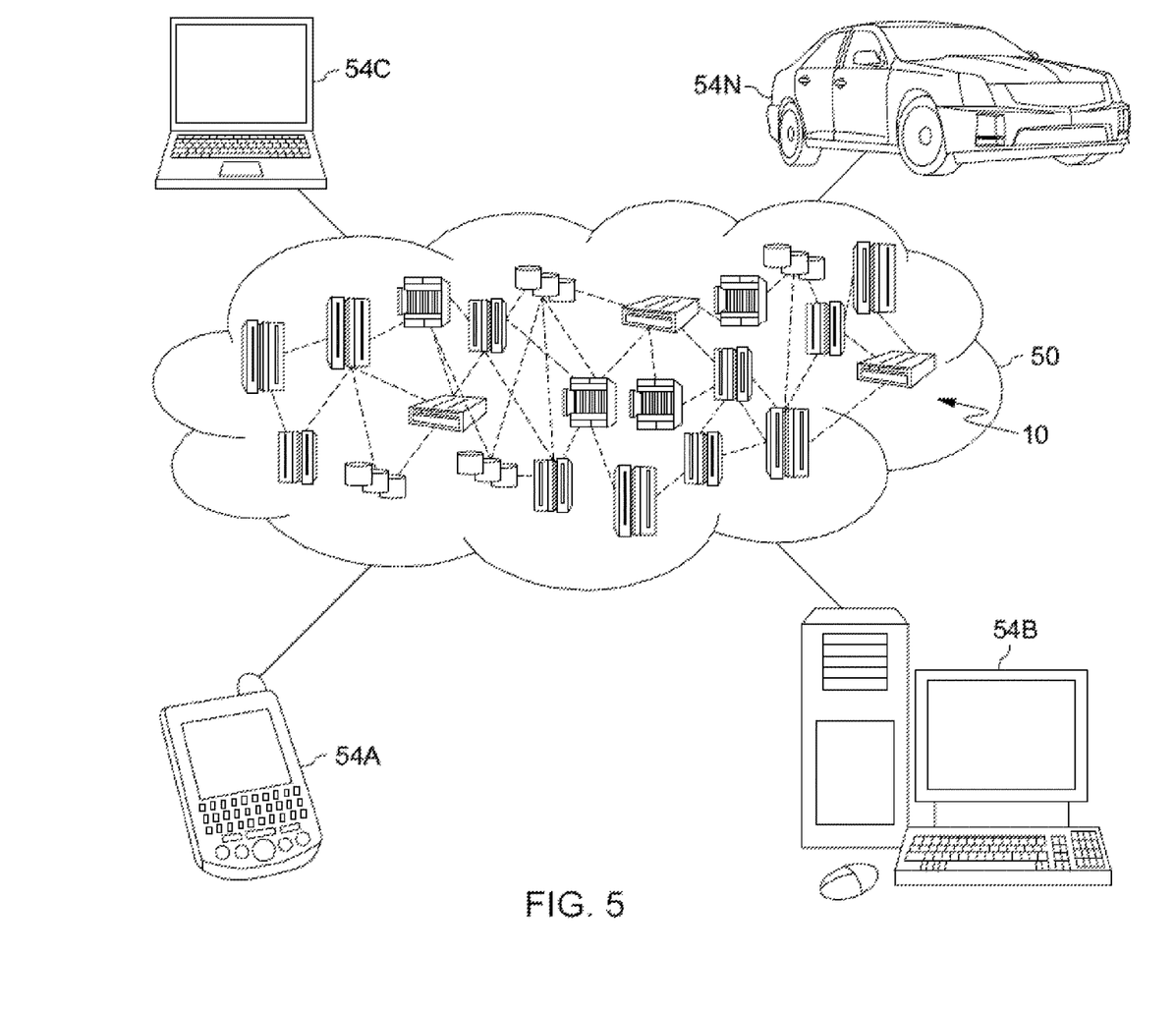
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
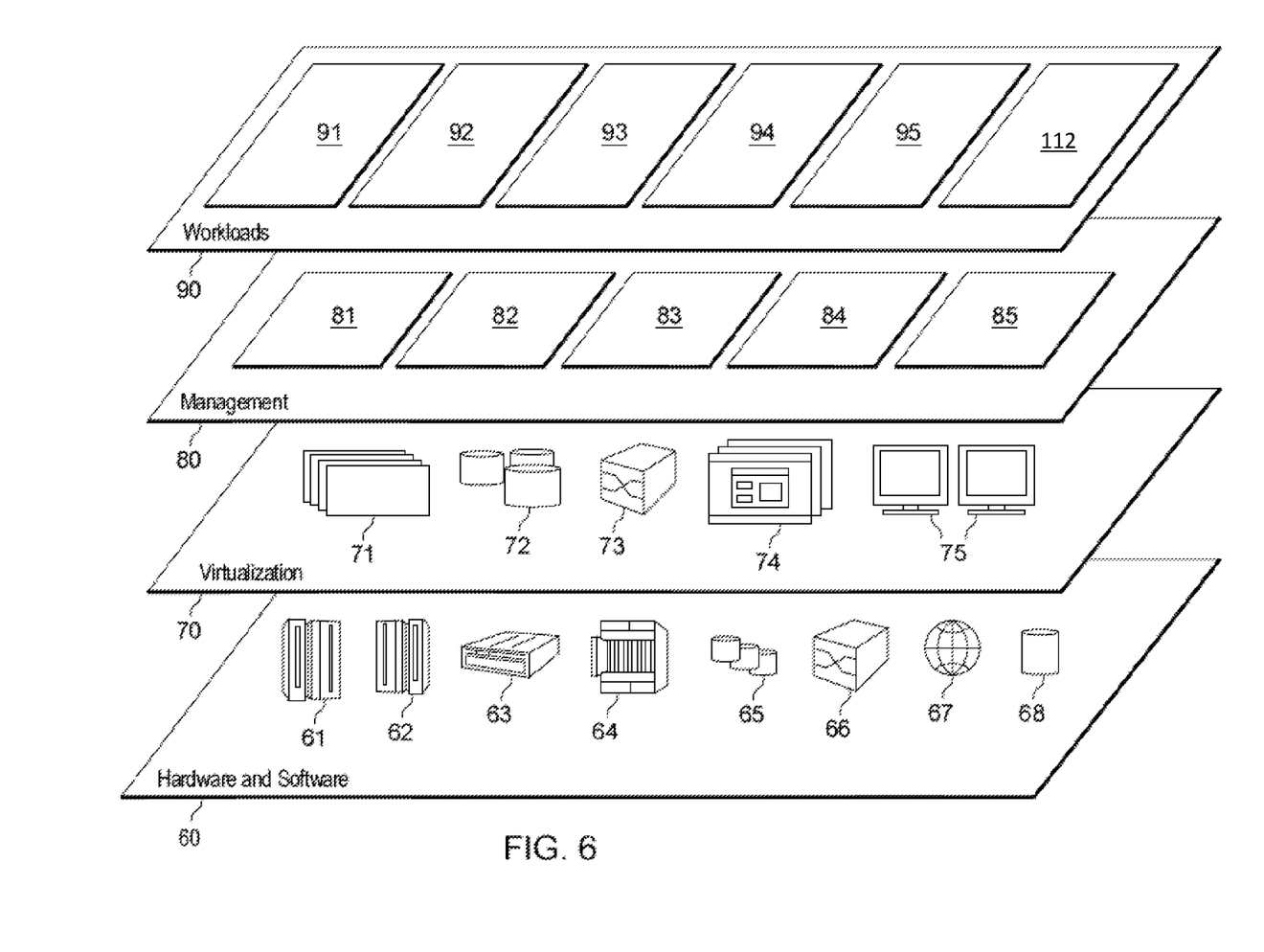
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and directional command program 112.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
responsive to initializing an augmented reality device associated with a user, establishing a field of view for the augmented reality device associated with the user;
establishing boundaries for a directional command area, wherein the directional command area includes a plurality of devices configurable to receive commands from the augmented reality device associated with the user;
receiving a first command performable by at least two devices of the plurality of devices;
responsive to receiving orientation data from the augmented reality device associated with the user, determining a first device from the plurality of devices for performing the first command by:
determining that the orientation data includes a first image of an eye position for a line of sight of the user and a second image of the field of view for the augmented reality device associated with the user, wherein the second image includes a mirrored image of a first device of the plurality of devices, and wherein the line of sight of the user is directed to the mirrored image of the first device;
determining whether the mirrored image of the first device is capturable by the augmented reality device based on a location of the user, a location of the first device, and a known floorplan for the direction command area;
responsive to determining that the mirrored image of the first device is capturable by the augmented reality device, determining that the first command is directed to the first device; and
sending the first command to the first device.

2. The computer-implemented method of claim 1, wherein determining the first device from the plurality of devices for performing the first command further comprises:
determining that the line of sight of the user is directed to the first device within the field of view; and
determining that the first command is directed to the first device within the field of view.

3. The computer-implemented method of claim 1, wherein determining the first device from the plurality of devices for performing the first command further comprises:
determining that the second image includes no devices from the plurality of devices;
responsive to determining a direction that the augmented reality device associated with the user is facing, determining, based on the known floorplan for the directional command area, that the first device is obscured by an object; and
determining that the first command is directed to the first device.

4. The computer-implemented method of claim 1, wherein the orientation data from the augmented reality device further includes sensory data from one or more sensors on the augmented reality device selected from the group consisting of: an accelerometer, a gyroscope sensor, and an orientation sensor.

5. The computer-implemented method of claim 1, further comprising:
responsive to receiving a confirmation from the first device regarding the first command, displaying the confirmation from the first device in at least one of: the augmented reality device and an electronic device paired to the augmented reality device.

6. A computer program product comprising one or more computer readable storage media and program instructions collectively stored on the one or more computer readable storage media, the stored program instructions executable by one or more computer processors to cause the one or more processors to perform a method comprising:
responsive to initializing an augmented reality device associated with a user, establishing a field of view for the augmented reality device associated with the user;
establishing boundaries for a directional command area, wherein the directional command area includes a plurality of devices configurable to receive commands from the augmented reality device associated with the user;
receiving a first command performable by at least two devices of the plurality of devices;
responsive to receiving orientation data from the augmented reality device associated with the user, determining a first device from the plurality of devices for performing the first command by:
determining that the orientation data includes a first image of an eye position for a line of sight of the user and a second image of the field of view for the augmented reality device associated with the user, wherein the second image includes a mirrored image of a first device of the plurality of devices, and wherein the line of sight of the user is directed to the mirrored image of the first device;
determining whether the mirrored image of the first device is capturable by the augmented reality device based on a location of the user, a location of the first device, and a known floorplan for the direction command area;

responsive to determining that the mirrored image of the first device is capturable by the augmented reality device, determining that the first command is directed to the first device; and sending the first command to the first device.

7. The computer program product of claim 6, wherein determining the first device from the plurality of devices for performing the first command further comprises:

determining that the line of sight of the user is directed to the first device within the field of view; and determining that the first command is directed to the first device within the field of view.

8. The computer program product of claim 6, wherein determining the first device from the plurality of devices for performing the first command further comprises:

determining that the second image includes no devices from the plurality of devices;

responsive to determining that a direction the augmented reality device associated with the user is facing, determining, based on the known floorplan for the directional command area, that the first device is obscured by an object; and determining that the first command is directed to the first device.

9. The computer program product of claim 6, wherein the orientation data from the augmented reality device further includes sensory data from one or more sensors on the augmented reality device selected from the group consisting of: an accelerometer, a gyroscope sensor, and an orientation sensor.

10. The computer program product of claim 6, the method further comprising:

responsive to receiving a confirmation from the first device regarding the first command, displaying the confirmation from the first device in at least one of: the augmented reality device and an electronic device paired to the augmented reality device.

11. A computer system comprising:

one or more computer processors;

one or more computer readable storage media, and program instructions collectively stored on the one or more computer readable storage media; and the program instructions, when executed by the one or more processors, cause the one or more processors to perform a method comprising:

responsive to initializing an augmented reality device associated with a user, establishing a field of view for the augmented reality device associated with the user;

establishing boundaries for a directional command area, wherein the directional command area includes a plurality of devices configurable to receive commands from the augmented reality device associated with the user;

receiving a first command performable by at least two devices of the plurality of devices;

responsive to receiving orientation data from the augmented reality device associated with the user, determining a first device from the plurality of devices for performing the first command by:

determining that the orientation data includes a first image of an eye position for a line of sight of the user and a second image of the field of view for the augmented reality device associated with the user, wherein the second image includes a mirrored image of a first device of the plurality of devices, and wherein the line of sight of the user is directed to the mirrored image of the first device;

determining whether the mirrored image of the first device is capturable by the augmented reality device based on a location of the user, a location of the first device, and a known floorplan for the direction command area;

responsive to determining that the mirrored image of the first device is capturable by the augmented reality device, determining that the first command is directed to the first device; and sending the first command to the first device.

12. The computer system of claim 11, wherein determining the first device from the plurality of devices for performing the first command further comprises:

determining that the line of sight of the user is directed to the first device within the field of view; and determining that the first command is directed to the first device within the field of view.

13. The computer system of claim 11, wherein determining the first device from the plurality of devices for performing the first command, further comprises:

determining that second image includes no devices from the plurality of devices;

responsive to determining that a direction the augmented reality device associated with the user is facing, determining, based on the known floorplan for the directional command area, that the first device is obscured by an object; and determining that the first command is directed to the first device.

14. The computer system of claim 11, wherein the orientation data from the augmented reality device further includes sensory data from one or more sensors on the augmented reality device selected from the group consisting of: an accelerometer, a gyroscope sensor, and an orientation sensor.

15. The computer system of claim 11, the method further comprising:

responsive to receiving a confirmation from the first device regarding the first command, displaying the confirmation from the first device in at least one of: the augmented reality device and an electronic device paired to the augmented reality device.

* * * * *